US011968767B2

(12) United States Patent
Schlosser et al.

(10) Patent No.: US 11,968,767 B2
(45) Date of Patent: Apr. 23, 2024

(54) EUV LIGHT SOURCE WITH A SEPARATION DEVICE

(71) Applicant: TRUMPF Lasersystems for Semiconductor Manufacturing GmbH, Ditzingen (DE)

(72) Inventors: Oliver Schlosser, Filderstadt (DE); Stefan Piehler, Stuttgart (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 0 days.

(21) Appl. No.: 18/493,889

(22) Filed: Oct. 25, 2023

(65) Prior Publication Data

US 2024/0057243 A1 Feb. 15, 2024

Related U.S. Application Data

(63) Continuation of application No. PCT/EP2021/060815, filed on Apr. 26, 2021.

(51) Int. Cl.
*H05G 2/00* (2006.01)

(52) U.S. Cl.
CPC ............. *H05G 2/008* (2013.01); *H05G 2/005* (2013.01)

(58) Field of Classification Search
CPC ............................... H05G 2/008; H05G 2/005
USPC ...................................................... 250/504 R
See application file for complete search history.

(56) References Cited

U.S. PATENT DOCUMENTS

| | | | | |
|---|---|---|---|---|
| 9,575,324 | B2 | 2/2017 | Lambert | |
| 9,596,743 | B2 | 3/2017 | Enzmann | |
| 10,932,350 | B2 | 2/2021 | Yanagida et al. | |
| 2008/0149862 | A1 | 6/2008 | Hansson et al. | |
| 2013/0026393 | A1* | 1/2013 | Abe | H05G 2/008 250/504 R |
| 2017/0099721 | A1* | 4/2017 | Tao | H05G 2/003 |
| 2021/0410262 | A1* | 12/2021 | Takashima | G03F 7/70025 |

FOREIGN PATENT DOCUMENTS

| | | | |
|---|---|---|---|
| WO | WO 2015036024 | A1 | 3/2015 |
| WO | WO 2015036025 | A1 | 3/2015 |

* cited by examiner

*Primary Examiner* — Kiet T Nguyen
(74) *Attorney, Agent, or Firm* — LEYDIG, VOIT & MAYER, LTD.

(57) ABSTRACT

A EUV light source includes a prepulse laser source for emitting a prepulse laser beam at a prepulse wavelength, a main pulse laser source for emitting a main pulse laser beam at a main pulse wavelength, a prepulse beam guiding device for feeding the prepulse laser beam into a radiation generating chamber for irradiation of a target material with a prepulse, and a main pulse beam guiding device for feeding the main pulse laser beam into the radiation generating chamber for irradiation of the target material with a main pulse. The target material is configured to emit EUV radiation on account of the irradiation with the prepulse and the main pulse. The prepulse beam guiding device has a separation device configured to reflect disturbing radiation in a wavelength range that does not include the prepulse wavelength back into the radiation generating chamber or into at least one beam trap.

13 Claims, 3 Drawing Sheets

EUV LIGHT SOURCE WITH A SEPARATION DEVICE

CROSS REFERENCE TO RELATED APPLICATIONS

This application is a continuation of International Application No. PCT/EP2021/060815 (WO 2022/228646 A1), filed on Apr. 26, 2021. The aforementioned application is hereby incorporated by reference herein.

FIELD

Embodiments of the present invention relate to an extreme ultraviolet (EUV) light source.

BACKGROUND

A EUV light source is a radiation source which serves for emitting EUV radiation. EUV radiation denotes electromagnetic radiation having a wavelength of between 5 nm and 30 nm. EUV radiation finds application in the semiconductor industry, in particular. Compared with lithography apparatuses that are currently widely used and are operated with wavelengths in the UV wavelength range, the use of EUV radiation for microlithographic fabrication allows the reliable production of components with significantly smaller feature sizes and thus results in a corresponding increase in performance.

The EUV light source is suitable for generating EUV radiation by means of an LPP ("Laser Produced Plasma") process. The target material, which is typically a metal, in particular tin, is provided preferably in droplet form by means of the providing device. A respective droplet is in each case firstly irradiated with one, two or optionally more than two prepulses. The prepulse or the prepulses serve(s) to prepare the droplet for the irradiation by the main pulse, in particular to heat up the droplet, to expand it, to vaporize it and/or to produce a plasma. The subsequent irradiation of a respective droplet by a respective main pulse serves to convert the target material to the plasma state, as a result of which the emission of EUV radiation occurs.

The prepulses are laser pulses of the at least one prepulse laser beam, and the main pulses are laser pulses of the main pulse laser beam. The wavelength of the or a respective prepulse laser beam and thus of the prepulses is referred to as the prepulse wavelength, and the wavelength of the main pulse laser beam and thus of the main pulses is referred to as the main pulse wavelength. The main pulse laser source is a $CO_2$ laser, for example, and the prepulse laser source is a solid-state laser, for example. The use of a prepulse laser source in the form of a solid-state laser has the advantage of a higher conversion efficiency compared with the use of a prepulse laser source in the form of a further $CO_2$ laser. The prepulse beam guiding device and the main pulse beam guiding device generally each have a multiplicity of optical elements, for example lenses and/or mirrors.

The prepulse laser source can have exactly one laser source for generating one prepulse laser beam at one prepulse laser wavelength. However, the prepulse laser source can also have two or more laser sources for generating two or more prepulse laser beams, which can have the same or different prepulse laser wavelengths, as is described in U.S. Pat. No. 10,932,350 B2, for example. For the case where two different prepulse laser wavelengths are used, they typically do not differ greatly from one another in order to enable the prepulse laser beams to be guided jointly via the optical elements of the prepulse beam guiding device. For the case where the prepulse laser source has two or more laser sources for generating two or more prepulse laser beams, the prepulse laser beams are generally combined in the prepulse laser source and directed jointly via the optical elements of the prepulse beam guiding device. The prepulse laser beams can pass through the optical elements of the prepulse beam guiding device collinearly, but this is not always necessary; in this respect, cf. U.S. Pat. No. 10,932,250 B2.

During the irradiation of the target material in the form of the droplets, a portion of the main pulses is scattered at the target material. Moreover, the target material emits electromagnetic radiation in a broadband fashion on account of the irradiation. Part of this scattered and/or emitted radiation passes as disturbing electromagnetic radiation into the prepulse beam guiding device, where it results in undesired effects, in particular in heating of optical elements of the prepulse beam guiding device and thermal lens effects associated therewith. A particular challenge furthermore arises owing to the fact that typically there is only little space available for structural adaptations of the EUV light source on account of the use of two separate beam guiding devices for the prepulses and the main pulses.

EUV beam generating devices having two beam sources for emitting two laser beams (prepulse laser beam and main pulse laser beam) having different wavelengths, which enter a vacuum chamber via a respective opening, are described in WO 2015/036024 A1 and WO 2015/036025 A1. In WO 2015/036024 A1, in one example, the openings in the vacuum chamber are closed off in a gas-tight manner by a respective window which transmits the respective laser beam (prepulse or main pulse laser beam). In that case, the window which transmits the main pulse laser beam has a coating that reflects the prepulse laser beam on its vacuum-side surface. This serves for the superposition of the prepulse and main pulse laser beams and for joint beam guiding within the vacuum chamber toward the target material. A superposition the other way around is also described.

SUMMARY

Embodiments of the present invention provide an extreme ultraviolet (EUV) light source. The EUV light source includes a providing device for providing a target material, a prepulse laser source for emitting at least one prepulse laser beam at at least one prepulse wavelength, a main pulse laser source for emitting a main pulse laser beam at a main pulse wavelength different than the at least one prepulse wavelength, a prepulse beam guiding device for feeding the at least one prepulse laser beam from the prepulse laser source into a radiation generating chamber and for focused irradiation of the target material within the radiation generating chamber with at least one prepulse of the at least one prepulse laser beam, and a main pulse beam guiding device for feeding the main pulse laser beam from the main pulse laser source into the radiation generating chamber and for focused irradiation of the target material within the radiation generating chamber with a main pulse of the main pulse laser beam. The target material is configured to emit EUV radiation on account of the focused irradiation with the at least one prepulse and the focused irradiation with the main pulse. The prepulse beam guiding device has at least one separation device configured to reflect disturbing radiation entering the prepulse beam guiding device from the radiation generating chamber in at least one wavelength range that does not comprise the at least one prepulse wavelength back into the radiation generating chamber, or into at least one beam trap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
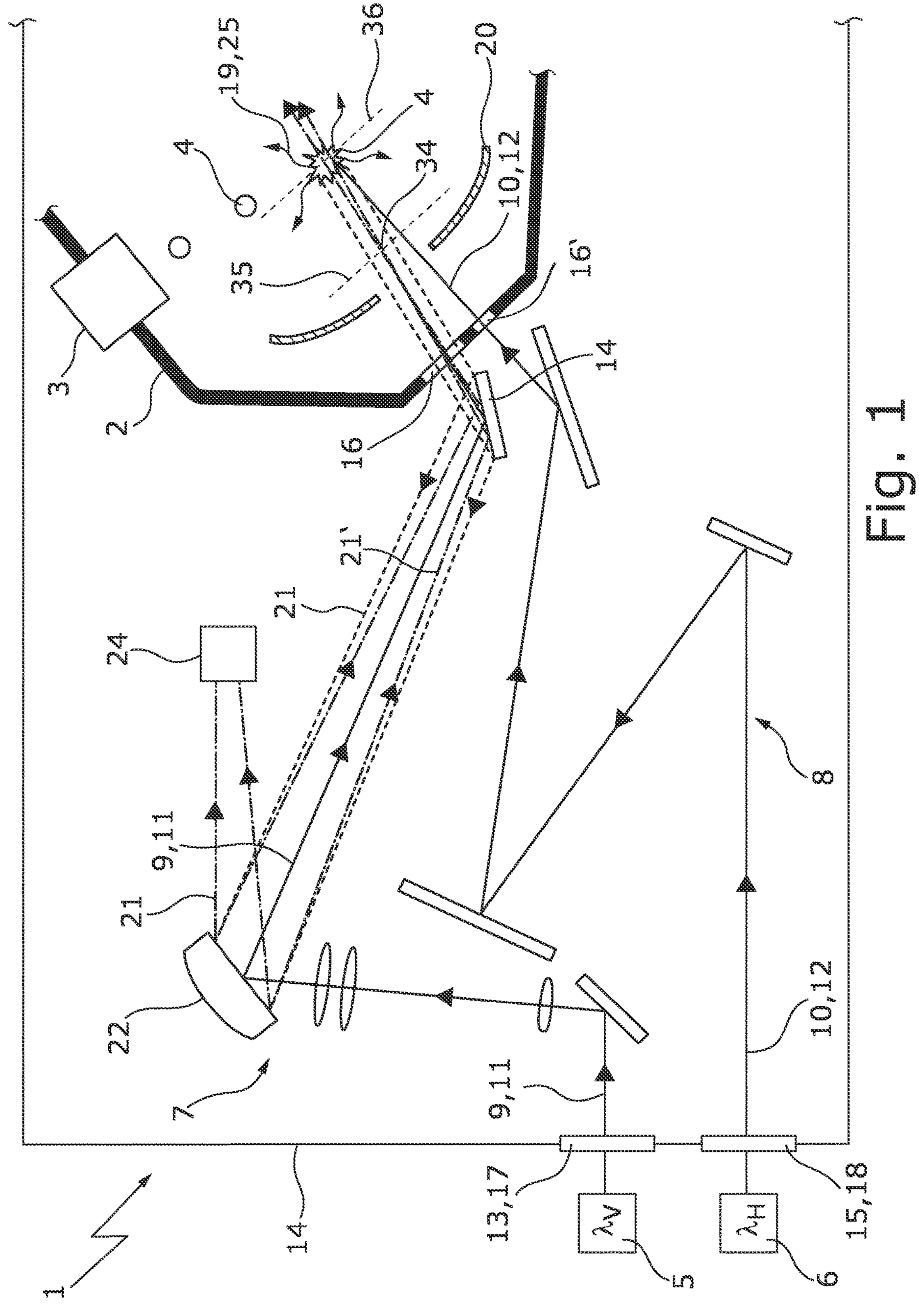
FIG. 1 illustrates a EUV light source with a prepulse beam guiding device having a separation device in order to reflect disturbing radiation entering the prepulse beam guiding device from a radiation generating chamber back into the radiation generating chamber in a focused manner, according to some embodiments.

Embodiments of the present invention provide a EUV light source in which disadvantageous effects of disturbing radiation entering the prepulse beam path are avoided, in particular in a space-saving manner.

According to some embodiments, a EUV light source includes a providing device for providing a target material, a prepulse laser source for emitting at least one prepulse laser beam at at least one prepulse wavelength, a main pulse laser source for emitting a main pulse laser beam at a main pulse wavelength different than the at least one prepulse wavelength, a prepulse beam guiding device for feeding the at least one prepulse laser beam from the prepulse laser source into a radiation generating chamber and for the focused irradiation of the target material within the radiation generating chamber with in each case at least one prepulse of the at least one prepulse laser beam, and a main pulse beam guiding device for feeding the main pulse laser beam from the main pulse laser source into the radiation generating chamber and for the focused irradiation of the target material within the radiation generating chamber with in each case a main pulse of the main pulse laser beam, the target material being configured to emit EUV radiation on account of the irradiation. The prepulse beam guiding device has at least one separation device configured to reflect disturbing radiation entering the prepulse beam guiding device from the radiation generating chamber in at least one wavelength range which does not comprise the at least one prepulse wavelength back into the radiation generating chamber in a focused manner or into at least one beam trap in a focused manner.

The separation device comprises one or more optical elements and forms part of the prepulse beam guiding device. It is arranged in the beam path of the prepulse laser beam upstream of the entrance into the radiation generating chamber. The separation device, to put it more precisely at least one part of the separation device, exhibits a wavelength-dependent behavior, as a result of which the prepulses and the disturbing radiation are influenced differently. This wavelength dependence can be the consequence of interference effects, for example. To that end, the separation device can have a diffraction grating or a dichroic mirror, for example. A dichroic mirror is an optical element which has a layer stack composed of at least two dielectric materials having different refractive indices and therefore reflects or transmits radiation in a wavelength-dependent manner. As a result of the wavelength-dependent behavior of the separation device, the prepulses can be fed into the radiation generating chamber and be focused onto the target material, while the disturbing electromagnetic radiation in at least one wavelength range which does not comprise the at least one prepulse wavelength is reflected back into the radiation generating chamber in a focused manner or into at least one beam trap in a focused manner. As a result, the further prepulse beam guiding device, i.e. that part of the prepulse beam guiding device which lies in the beam path of the prepulses upstream of the separation device, is not adversely affected any further by the disturbing electromagnetic radiation.

If the disturbing radiation is reflected back into the radiation generating chamber, then this has the advantage of being space-saving since no additional structural space for a beam trap is necessary. This is advantageous in the present case of two separate beam guiding devices since the space conditions are greatly restricted. The focusing of the disturbing radiation reflected back into the radiation generating chamber has the consequence that said radiation can pass through an opening in the radiation generating chamber without being obstructed and can enter the radiation generating chamber again. The radiation that is divergent downstream of the focus is then absorbed within the radiation generating chamber.

In the case of reflection into the at least one beam trap, the disturbing electromagnetic radiation is absorbed in the beam trap. On account of the focusing into the beam trap, structural space can be saved in this case, too. For absorbing high powers, the beam trap typically has a suitable device for cooling.

Instead of one separation device it is also possible to use a plurality of separation devices, for example in order to reflect the disturbing radiation in different wavelength ranges back into the radiation generating chamber in a focused manner or into at least one beam trap in a focused manner. In this case, the individual separation devices can also be constructed differently.

In one embodiment, the separation device is configured to reflect disturbing radiation in the form of a portion of the main pulses that was backscattered at the target material back into the radiation generating chamber in a focused manner or into the at least one beam trap in a focused manner. Since the main pulse laser beam for converting the target material to the plasma state has a high power of typically more than approximately 30-40 kW, it is important to reduce the influence of the backscattered portion of the main pulses on the prepulse beam guiding device. For this purpose, the wavelength dependence of the separation device is adapted to the main pulse wavelength in a targeted manner.

In a further embodiment, the separation device is configured to reflect disturbing radiation in the form of radiation emitted on account of the irradiation of the target material in at least one wavelength range which does not comprise the at least one prepulse wavelength back into the radiation generating chamber in a focused manner or into the at least one beam trap in a focused manner. The irradiation of the target material results in a typically broadband emission of radiation which also comprises portions in the UV/VIS range, corresponding to wavelengths of 100 nm to 780 nm, and has a disadvantageous effect upon entrance into the prepulse beam guiding device.

In one embodiment, the separation device is configured to reflect the prepulses. In this case, the separation device can serve e.g. as a (plane) diverting mirror for the prepulses.

In one development of this embodiment, the separation device comprises a dichroic mirror and a curved deflection mirror, the dichroic mirror serving as a diverting mirror for reflecting the prepulses and being configured to transmit the disturbing radiation in at least one wavelength range which does not comprise the at least one prepulse wavelength, and the curved deflection mirror being configured to reflect the disturbing radiation transmitted by the dichroic mirror, preferably through the dichroic mirror, back into the radiation generating chamber in a focused manner or into the at least one beam trap in a focused manner. In this case, the curvature of the deflection mirror serves for focusing the disturbing radiation. The orientation of the curved deflection mirror is chosen such that the disturbing radiation is reflected in the desired direction.

In order to avoid disadvantageous effects of the disturbing radiation on the prepulse beam guiding device, this need not necessarily be reflected back into the radiation generating chamber in a focused manner or into the at least one beam trap in a focused manner. Alternatively, a dichroic mirror can also serve as a diverting mirror for reflecting the prepulses and be configured to transmit the disturbing radiation in at least one wavelength range which does not comprise the at least one prepulse wavelength. In this case, a beam trap is arranged such that the disturbing radiation transmitted by the dichroic mirror is absorbed in the beam trap. One disadvantage of this solution is that typically there is not enough space available for this.

In one development of this embodiment, the separation device has a main body, which transmits the disturbing radiation, the dichroic mirror being configured as a coating on a front side of the main body and the deflection mirror being configured as a coating on a rear side of the main body. In this case, the dichroic mirror and the deflection mirror are not two separate optical elements, rather they form one common separation element. One advantage of this embodiment resides in the small space format. The optical separation element is based on a dielectric main body consisting of zinc selenide (ZnSe), diamond or SiC, for example, said main body transmitting the disturbing radiation. The coating on the front side of the main body should have the highest possible reflectance at the at least one prepulse wavelength and the highest possible transmittance in the at least one wavelength range which does not comprise the at least one prepulse wavelength, in particular at the main pulse wavelength. The coating on the rear side of the main body should have the highest possible reflectance for the disturbing radiation transmitted by the dichroic mirror, in particular at the main pulse wavelength. For this purpose, the coatings on the front side and the rear side comprise for example a multiplicity of thin dielectric layers of at least two materials having different refractive indices, which are applied to the main body of the optical separation element by means of a suitable deposition method. The coating on the rear side of the main body can also comprise a highly reflective metallic layer or coating, instead of a dielectric coating.

In a further embodiment, the separation device is configured to transmit the prepulses.

In one development of this embodiment, the separation device comprises a main body, which transmits the prepulses and which has an entrance surface, through which the prepulses enter the main body, and a curved exit surface, through which the prepulses emerge from the main body, the curved exit surface having a coating configured to transmit the prepulses and to reflect the disturbing radiation in at least one wavelength range which does not comprise the at least one prepulse wavelength back into the radiation generating chamber in a focused manner or into the at least one beam trap in a focused manner. In this case, too, the separation device forms a single optical separation element. In this case, the optical separation element is based on a dielectric main body consisting of quartz glass or sapphire, for example. The curved exit surface typically has a concave shape for focusing the disturbing radiation. The reflectance of the coating of the exit surface should be as high as possible in the at least one wavelength range which does not comprise the at least one prepulse wavelength, in particular at the main pulse wavelength, while the transmittance should be as high as possible at the at least one prepulse wavelength. The coating of the curved exit surface can preferably also be embodied as a bandpass filter which transmits the prepulses as well as possible and reflects all other wavelengths as well as possible. The coating of the curved exit surface can comprise a multiplicity of thin dielectric layers which are applied on the main body by means of a suitable vapor deposition method, for example by means of a method according to the principle of physical vapor deposition.

In one development of this embodiment, the entrance surface and the exit surface are curved in such a way that the optical separation element serves as a focusing lens for the prepulses. A concave shape of the exit surface of the optical separation device, considered in isolation, results in a divergence of the emerging prepulses. However, if the entrance surface is convex and more highly curved than the exit surface, that is to say if the radius of curvature of the entrance surface is smaller than the radius of curvature of the exit surface, then the optical separation element overall acts as a focusing lens for the prepulses. Other configurations of the curvature of the entrance surface and/or the exit surface are also possible which result in the optical separation element serving as a focusing lens for the prepulses.

In a further embodiment, the entrance surface has an antireflection coating for increasing the transmission of the prepulses. As a result, backreflections of the prepulses upon entering the optical separation element and problems associated therewith are avoided and the efficiency of the EUV light source is increased. The transmittance at the at least one prepulse wavelength should be as high as possible, in principle, for this purpose. In this case, too, the antireflection coating can be configured for example in the form of a layer stack composed of thin dielectric layers.

In a further embodiment, the separation device is configured to reflect the disturbing radiation in at least one wavelength range which does not comprise the at least one prepulse wavelength back into the radiation generating chamber in a focused manner, a focus of the backreflected disturbing radiation being offset relative to the carrier material and in particular a focal plane of the backreflected disturbing radiation being arranged upstream of a target plane. This has the advantage that as a consequence the plasma production is not influenced, or is only slightly influenced, by the backreflected disturbing radiation.

The focal plane of the backreflected disturbing radiation, in which the focus of the backreflected disturbing radiation lies, and the target plane, in which the target material is irradiated in a focused manner, are planes perpendicular to the beam axis of the prepulse laser beam. The further the focal plane of the disturbing radiation reflected back into the radiation generating chamber lies upstream of the target plane, the greater the extent to which the backreflected disturbing radiation is expanded in the target plane and the smaller the influence on the plasma production. Alternatively or additionally, it is possible for the focus of the backreflected disturbing radiation not to lie on the beam axis of the prepulse laser beam, but rather to have a slight angular offset. As a consequence, the backreflected disturbing electromagnetic radiation, downstream of its focus, does not impinge directly on the target material.

The focus of the disturbing radiation reflected back into the radiation generating chamber is not necessarily an ideal focus. Rather, it may be advantageous for the corresponding power density distribution to be spatially blurred. In this case, the rays of the disturbing radiation reflected back into the vacuum chamber do not intersect at a point. This can be achieved for example by means of a corresponding design of the curved exit surface or of the curved deflection mirror.

In a further embodiment, the at least one prepulse wavelength is less than 1.5 μm and the main pulse wavelength is more than 10 μm. Compared with conventional prepulse wavelengths of around 10 μm, the use of correspondingly short prepulse wavelengths results in a higher conversion efficiency. The reason for this, inter alia, is that short pulse durations and a sharp focusing of the prepulses onto the target material are thus achieved, and that the prepulses have a different absorption behavior than the main pulses. By way of example, the prepulse wavelength can be 1030 nm if a Yb:YAG laser serves as a prepulse laser source.

In a further embodiment, the EUV light source has a vacuum chamber, in which the radiation generating chamber is arranged, the vacuum chamber having a first opening with a first window for the passage of the at least one prepulse laser beam and a second opening with a second window for the passage of the main pulse laser beam. The vacuum prevailing in the radiation generating chamber is typically not sealed from the environment at one or at a plurality of openings in the radiation generating chamber itself, but rather at a vacuum chamber in which the radiation generating chamber is arranged. As a result, a sufficient distance between the windows and the target material can be established, such that contamination of the windows by the target material can be avoided or at least greatly reduced. On account of the different prepulse wavelength(s) and the main pulse wavelength, the vacuum sealing typically requires two windows consisting of different materials, these materials being transmissive for the prepulse wavelength(s) and for the main pulse wavelength, respectively. With the aid of the separation device described further above, optical elements situated in that section of the beam path of the prepulse beam guiding device which is situated within the vacuum chamber (i.e. in a vacuum) can also be protected against disturbing radiation.

FIG. 1 illustrates an EUV light source 1 having a radiation generating chamber 2, a providing device 3 for providing a target material 4, a prepulse laser source 5, a main pulse laser source 6, a prepulse beam guiding device 7 and a main pulse beam guiding device 8. The target material 4 is tin provided in the form of droplets 4 by the providing device 3 within the radiation generating chamber 2. The droplets 4 emerging from the providing device 3 move within the radiation generating chamber 2 along a predefined movement path running approximately rectilinearly. In principle, however, the target material 4 can also be a different material, for example a different metal. Moreover, the providing by means of the providing device 3 need not be effected in droplet form.

The prepulse laser source 5 emits a pulsed laser beam referred to hereinafter as prepulse laser beam 9, while the main pulse laser source 6 emits a pulsed laser beam referred to hereinafter as main pulse laser beam 10. The laser pulses of the prepulse laser beam 9 are referred to as prepulses 11, and the laser pulses of the main pulse laser beam 10 are referred to as main pulses 12. The main pulse laser source 6 illustrated is a $CO_2$ laser. The wavelength of the main pulse laser beam 10, referred to as main pulse wavelength $\lambda_H$, is approximately 10.6 μm. However, the main pulse laser source 6 can also be some other laser. The prepulse laser source 5 illustrated is a Yb:YAG laser. The wavelength of the prepulse laser beam 9, referred to as prepulse wavelength $\lambda_V$, is 1030 nm. However, the prepulse laser source 5 can also be some other laser, for example some other solid-state laser, a fiber laser, etc.

The prepulse laser source 5 can also have two or optionally more than two laser sources, each configured for generating a prepulse laser beam 9. In this case, the prepulse laser beams are combined in the prepulse laser source 5. The prepulse laser beams 9 generated by the prepulse laser source 5 can have the same prepulse wavelength $\lambda_V$, but it is also possible for the prepulse laser beams to have different prepulse wavelengths $\lambda_V$, which in general differ only slightly, however, in order that they can be guided with the aid of the common prepulse beam guiding device 7.

The prepulse laser beam 9 from the prepulse laser source 5 is fed to the radiation generating chamber 2 by means of the prepulse beam guiding device 7. In the process the prepulse laser beam 9 passes through a first opening 13 in a vacuum chamber 14, in which the radiation generating chamber 2 is arranged. In addition, the prepulse laser beam 9 is focused onto the tin droplets 4 by means of the prepulse beam guiding device 7. For these purposes, the prepulse beam guiding device 7 illustrated comprises a plurality of optical elements in the form of lenses and mirrors. However, the prepulse beam guiding device 7 can also have other transmissive and/or reflective optical elements for these purposes.

The main pulse laser beam 10 from the main pulse laser source 6 is fed to the radiation generating chamber 2 by means of the main pulse beam guiding device 8. In the process the main pulse laser beam 10 passes through a second opening 15 in the vacuum chamber 14. In addition, the main pulse laser beam 10 is focused onto the target material 4, to put it more precisely onto one of the tin droplets, by means of the main pulse beam guiding device 8. For these purposes, the main pulse beam guiding device 8 illustrated comprises a plurality of optical elements in the form of mirrors. In a departure therefrom, the main pulse beam guiding device 8 can also have other reflective and/or transmissive optical elements.

In particular within the vacuum chamber 14 the prepulse beam guiding device 7 and the main pulse beam guiding device 8 can also coincide at least in sections. The prepulse laser beam 9 and the main pulse laser beam 10 are then guided via the same optical elements in a respective section and form a common beam guiding device. In the example shown, the prepulse laser beam 9 and the main pulse laser beam 10 are guided into the radiation generating chamber 2 via separate openings 16, 16'. It goes without saying, however, that the prepulse laser beam 9 and the main pulse laser beam 10 can alternatively be guided into the radiation generating chamber 2 via a common opening.

Since the pressure within the vacuum chamber 14 is typically significantly lower than that outside the vacuum chamber 14, the openings 13, 15 are closed off in a gas-tight manner, by means of a respective window 17, 18 in the example illustrated. The first window 17 consists of quartz glass and has a high transmission at the prepulse wavelength $\lambda_V$. The second window 18 is a diamond window having a high transmission at the main pulse wavelength $\lambda_H$. However, the two windows 17, 18 can also consist of other materials. The openings 16, 16' via which the prepulse laser beam 9 and the main pulse laser beam 10 respectively enter the radiation generating chamber 2 have no windows.

The tin droplets are irradiated in a focused manner in each case firstly with two prepulses 11 and then with in each case one main pulse 12. A respective focus position of the prepulses 11 and of the main pulse 12 during the focused irradiation does not necessarily correspond to the position of the tin droplet. Rather, the respective focus position of the prepulses 11 and of the main pulse 12 can lie in the beam path upstream or downstream of the tin droplet. A higher conversion efficiency is thus achieved in comparison with the irradiation only with a main pulse 12. As a consequence of the irradiation, the tin droplets are converted to the plasma state and EUV radiation 19 is emitted, which is collected by means of a collector mirror 20 arranged in the radiation generating chamber 2. The radiation generating chamber 2 serves as a mount or as a supporting frame for the collector mirror 20. The collector mirror 20 has an opening, through which the prepulses 11 and also the main pulse 12 pass. The providing device 3 is attached to the radiation generating chamber 2 and serves for providing the target material 4 within the radiation generating chamber 2.

During the irradiation, a portion 21 of the main pulses 12 is backscattered at the tin droplets and passes as disturbing radiation 21 into the prepulse beam guiding device 7. In this case, the tin droplets can be assumed essentially to be a point light source. The prepulse beam guiding device 7 has a separation device 22 in order to reflect the disturbing radiation 21 in the form of the backscattered portion of the main pulses 12 back into the radiation generating chamber 2 in a focused manner. The disturbing radiation 21' reflected back into the radiation generating chamber 2 is absorbed within the radiation generating chamber 2. This serves to avoid disadvantageous effects, in particular thermal effects, for example thermal lens effects, which can be caused by the disturbing radiation 21 in the prepulse beam guiding device 7. The separation device 22 shown in FIG. 1 functions in this case as a diverting mirror for the prepulses 11. Furthermore, an additional diverting mirror 23 is situated between the separation device 22 and the radiation generating chamber 2. In a departure therefrom, it is also possible for one or more other optical elements or no additional optical element to be situated between the separation device 22 and the radiation generating chamber 2.

Alternatively, the separation device 2, as likewise shown in FIG. 1, can be configured to reflect the disturbing radiation 21 into one beam trap 24 in a focused manner or, unlike the illustration shown in FIG. 1, to reflect said disturbing radiation into more than one beam trap 24 in a focused manner.

The disturbing radiation 21 is not restricted to the backscattered portion 21 of the main pulses 12. By way of example, as a consequence of the irradiation of the target material 4, radiation 25 is emitted which is typically very broadband and likewise passes as disturbing radiation 21 into the prepulse beam guiding device 7. In this case, too, the target material 4 can be described essentially as a point light source. By means of the separation device 22, the disturbing radiation 21 also in more than one wavelength range which does not comprise the at least one prepulse wavelength $\lambda_V$ can be reflected back into the vacuum chamber 2 in a focused manner or be reflected into at least one beam trap 24 in a focused manner.

In the example shown, the additional diverting mirror 23 serves to absorb the radiation 25 which is emitted by the target material 4 as a consequence of the irradiation and which enters the prepulse beam guiding device 7 as disturbing radiation 21, primarily in the UV/VIS range. The additional diverting mirror 23 is suitably cooled for this purpose. Alternatively, the additional diverting mirror 23 can transmit the disturbing radiation 21, such that the latter can be absorbed by a suitably arranged beam trap.

In addition to the separation device 22, further separation devices 22 can also be arranged in the prepulse beam guiding device 7, for example in order to reflect the disturbing radiation 21 in different wavelength ranges back into the radiation generating chamber 2 in a focused manner or into at least one beam trap 24 in a focused manner.

Alternatively, the additional diverting mirror 23 can also absorb the disturbing radiation 21 as completely as possible while the prepulses 11 are reflected as completely as possible. For this purpose, the additional diverting mirror 23 can have a coating which acts as a bandpass filter and which is highly reflective only for the prepulse wavelength $\lambda_V$, while the coating transmits or absorbs all other wavelengths. For the case where the substrate material of the additional diverting mirror 23 absorbs the wavelengths deviating from the prepulse wavelength $\lambda_V$, the disturbing radiation 21—given appropriate cooling of the additional diverting mirror 23—is absorbed. The rear side of the additional diverting mirror 23 can also have an absorption layer which, given appropriate cooling of the additional diverting mirror 23, can likewise be used as a "beam sink". A disadvantage of this solution is a thermal deformation of the additional diverting mirror 23 that is caused by the absorption, and an accompanying impairment of the quality of the prepulse beam guiding device 7.

Figure 2:
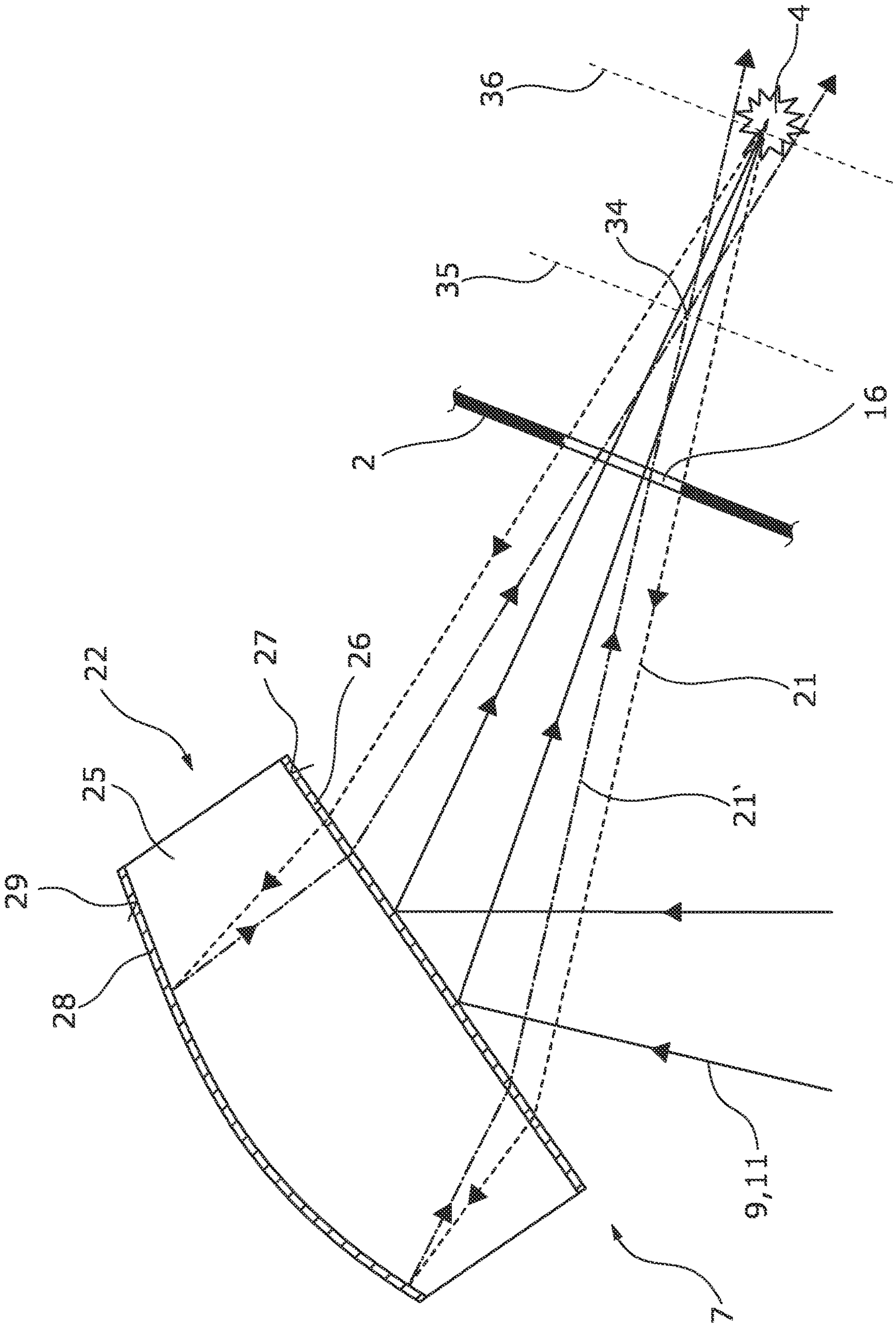
FIG. 2 shows a schematic detail view of the EUV light source shown in FIG. 1 with a separation device being configured to reflect a prepulse laser beam, according to some embodiments.

FIG. 2 illustrates the EUV light source 1 shown in FIG. 1 in a detail view. For simplification here, inter alia, the additional diverting mirror 23 between the separation device 22 and the first opening 13 in the radiation generating chamber 2 is not shown.

In the example illustrated, the separation device is a single optical separation element 22. The optical separation element 22 has a dielectric main body 25, which consists of quartz glass in the example shown. A coating 26 in the form of a layer stack composed of dielectric layers on a front side 27 of the optical separation element 22 serves as a dichroic mirror 26. A coating 28 in the form of a metal layer on a rear side 29 of the optical separation element 28 serves as a curved deflection mirror 28. The coatings 26, 28 need not be realized respectively as a layer stack composed of dielectric layers and as a thin metal layer.

The dichroic mirror 26 serves as a diverting mirror for reflecting the prepulses 11. Furthermore, the disturbing radiation 21 entering the prepulse beam guiding device 7 from the radiation generating chamber 2 in at least one wavelength range which does not comprise the prepulse wavelength $\lambda_V$ is transmitted by the dichroic mirror 26. The transmitted disturbing radiation 21 impinges on the curved deflection mirror 28 and is reflected by the latter back into the radiation generating chamber 2 in a focused manner through the dichroic mirror 26.

In contrast to the illustration shown in FIG. 2, the disturbing radiation 21' reflected by the curved deflection mirror 28 need not pass through the dichroic mirror 26 once again. It is also possible for the transmitted disturbing radiation 21 to be reflected by the curved deflection mirror 28 toward at least one beam trap 24. Furthermore, the separation device 22 need not be a single optical separation element 22. Rather, the separation device 22 can also consist of a plurality of optical elements among which its function is shared. By way of example, the dichroic mirror 26 and the curved deflection mirror 28 can be separate optical elements.

Figure 3:
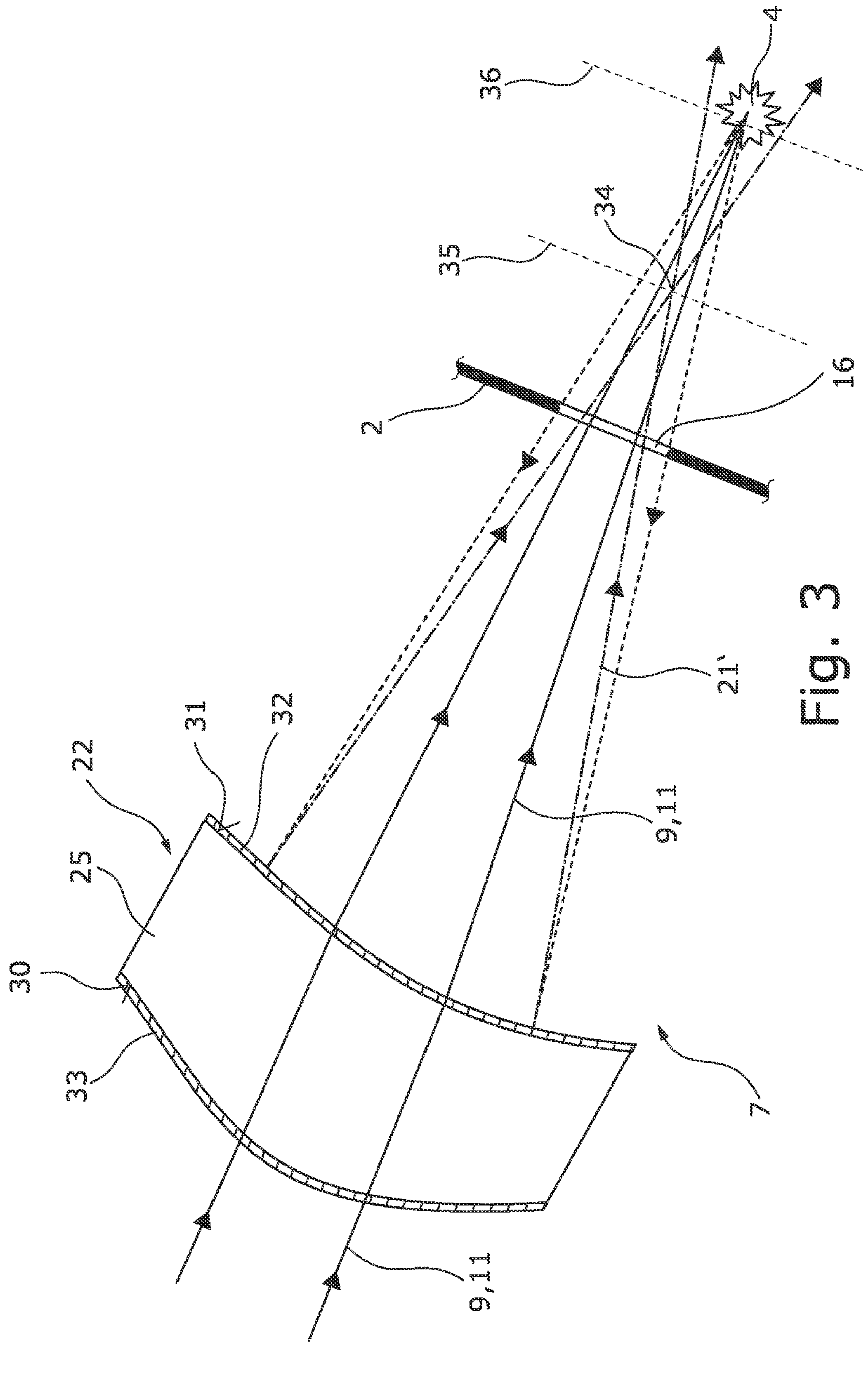
FIG. 3 shows a schematic detail view of the EUV light source shown in FIG. 1 with a separation device being configured to transmit a prepulse laser beam, according to some embodiments.

FIG. 3 illustrates an EUV light source 1, in a detail view, which substantially corresponds to the EUV light source 1 already shown in FIG. 1. In a departure from the EUV light source 1 shown in FIG. 1, the EUV light source 1 illustrated here has a prepulse beam guiding device 7 with a separation device 22 configured to transmit the prepulses 11.

In the example illustrated, the separation device is a single optical separation element 22. The optical separation element 22 has a dielectric main body 25, which consists of quartz glass in the example shown. The prepulses 11 enter the optical separation element 22 through an entrance surface 30 and exit again through a curved exit surface 31. The curved exit surface 31 has a coating 32, which in the example shown, but not necessarily, is a layer stack composed of dielectric layers of two materials having different refractive indices. The coating 32 of the curved exit surface 31 is configured to transmit the prepulses 11 and to reflect the disturbing radiation 21 in at least one wavelength range which does not comprise the prepulse wavelength $\lambda_V$ back into the radiation generating chamber 2 in a focused manner. In particular, the coating 32 of the curved exit surface 31 can be configured such that, in addition to the main pulse wavelength $\lambda_H$, other wavelength ranges, for example in the UV/VIS range, which do not comprise the prepulse wavelength v are also reflected.

The curvature of the entrance surface 30 of the optical separation element 22 illustrated in FIG. 3 is coordinated with the curvature of the exit surface 32 of the optical separation element 22 such that the optical separation element 22 serves as a focusing lens for the prepulses 11. For this purpose, in the example shown, the entrance surface 30 is convexly shaped and more highly curved than the exit surface 31. The entrance surface 30 of the optical separation element 22 additionally has an antireflection coating 33 for increasing the transmittance at the prepulse wavelength $\lambda_V$.

In a departure from the illustration in FIG. 3, the optical separation element 22 need not serve as a focusing lens for the prepulses 11 and the entrance surface need not have an antireflection coating 33. The separation device is not necessarily a single optical separation element 22, but rather can also comprise a plurality of optical elements.

In FIGS. 1-3, a focus 34 of the disturbing radiation 21' reflected back into the radiation generating chamber 2 is offset relative to the target material 4. More precisely, a focal plane 35 of the disturbing radiation 21' reflected back into the radiation generating chamber 2 lies distinctly upstream of a target plane 36, in which the target material 4 is provided. Both the prepulses 11 or the prepulse laser beam 9 and the main pulses 12 or the main pulse laser beam 10 are focused onto the target plane 36. As a result of the offset between the focal plane 34 of the backreflected disturbing radiation 21' and the target plane 36, the backreflected disturbing radiation 21' is expanded in the target plane 36 to such an extent that the plasma production is not influenced.

In a departure therefrom, it is possible for the focus 34 of the backreflected disturbing radiation 21' not to lie on the beam axis of the prepulse laser beam 9 or of the prepulses 11, but rather to be arranged laterally offset with respect to the beam axis, i.e. the beam axis of the backreflected disturbing radiation 21' can be oriented at a (small) angle with respect to the beam axis of the prepulse laser beam 9 in order to prevent the backreflected disturbing radiation 21' from impinging directly on the location of the irradiation of the target material 4 in the radiation generating chamber 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An extreme ultraviolet (EUV) light source, comprising:

a providing device for providing a target material, a prepulse laser source for emitting at least one prepulse laser beam at at least one prepulse wavelength, a main pulse laser source for emitting a main pulse laser beam at a main pulse wavelength different than the at least one prepulse wavelength, a prepulse beam guiding device for feeding the at least one prepulse laser beam from the prepulse laser source into a radiation generating chamber, and for focused irradiation of the target material within the radiation generating chamber with at least one prepulse of the at least one prepulse laser beam, and a main pulse beam guiding device for feeding the main pulse laser beam from the main pulse laser source into the radiation generating chamber, and for focused irradiation of the target material within the radiation generating chamber with a main pulse of the main pulse laser beam, the target material being configured to emit EUV radiation on account of the focused irradiation with the at least one prepulse and the focused irradiation with the main pulse, wherein: the prepulse beam guiding device has at least one separation device configured to reflect disturbing radiation entering the prepulse beam guiding device from the radiation generating chamber in at least one wavelength range that does not comprise the at least one prepulse wavelength back into the radiation generating chamber, or into at least one beam trap.

2. The EUV light source according to claim 1, wherein the separation device is configured to reflect the disturbing radiation in a form of a portion of the main pulses that is backscattered at the target material back into the radiation generating chamber or into the at least one beam trap.

3. The EUV light source according to claim 1, wherein the separation device is configured to reflect the disturbing radiation in a form of radiation emitted on account of the focused irradiation of the target material in the at least one wavelength range which does not comprise the at least one prepulse wavelength back into the radiation generating chamber or into the at least one beam trap.

4. The EUV light source according to claim 1, wherein the separation device is configured to reflect the prepulses.

5. The EUV light source according to claim 4, wherein the separation device comprises a dichroic mirror and a curved deflection mirror, wherein the dichroic mirror serves as a diverting mirror for reflecting the prepulses and is configured to transmit the disturbing radiation in the at least one wavelength range that does not comprise the at least one prepulse wavelength, and wherein the curved deflection mirror is configured to reflect the disturbing radiation transmitted through the dichroic mirror, back into the radiation generating chamber or into the at least one beam trap.

6. The EUV light source according to claim 5, wherein the separation device has a main body that transmits the disturbing radiation, and wherein the dichroic mirror is configured as a coating on a front side of the main body, and the deflection mirror is configured as a coating on a rear side of the main body.

7. The EUV light source according to claim 1, wherein the separation device is configured to transmit the prepulses.

8. The EUV light source according to claim 7, wherein the separation device comprises a main body that transmits the prepulses, and has an entrance surface and an exit surface, wherein the prepulses enter the main body through the entrance surface and emerge from the main body through the exit surface, and wherein the exit surface has a coating configured to transmit the prepulses and to reflect the disturbing radiation in the at least one wavelength range that does not comprise the at least one prepulse wavelength back into the radiation generating chamber or into the at least one beam trap.

9. The EUV light source according to claim 8, wherein the entrance surface and the exit surface are curved in such a way that the optical separation device serves as a focusing lens for the prepulses.

10. The EUV light source according to claim 8, wherein the entrance surface has an antireflection coating for increasing transmission of the prepulses.

11. The EUV light source according to claim 1, wherein the separation device is configured to reflect the disturbing radiation in the at least one wavelength range that does not comprise the at least one prepulse wavelength back into the radiation generating chamber in a focused manner, a focus of the backreflected disturbing radiation being offset relative to the target material, and a focal plane of the backreflected disturbing radiation being arranged upstream of a target plane.

12. The EUV light source according to claim 1, wherein the at least one prepulse wavelength is less than 1.5 μm, and the main pulse wavelength is more than 10 μm.

13. The EUV light source according to claim 1, further comprising a vacuum chamber, in which the radiation generating chamber is arranged, the vacuum chamber having a first opening with a first window for passage of the at least one prepulse laser beam and a second opening with a second window for passage of the main pulse laser beam.

* * * * *